William B. Chambers.
Catch for Corn Planter.

No. 117981 — Patented Aug 15 1871

Witnesses:
Wilbur F. Edmunson
Jno. C. Cloyd

Inventor,
William B Chambers

UNITED STATES PATENT OFFICE.

WILLIAM B. CHAMBERS, OF DECATUR, ILLINOIS.

IMPROVEMENT IN CORN-PLANTERS.

Specification forming part of Letters Patent No. 117,981, dated August 15, 1871.

*To all whom it may concern:*

Be it known that I, WILLIAM B. CHAMBERS, of Decatur, in the county of Macon and State of Illinois, have invented certain Improvements in Catch for Corn-Planter, of which the following is a specification:

My invention relates to a catch to be used upon corn-planters, so that when the lever is used to raise the seed-box and runners from the ground the lever is caught and held. This catch can be used upon a number of corn-planters.

Figure 1:
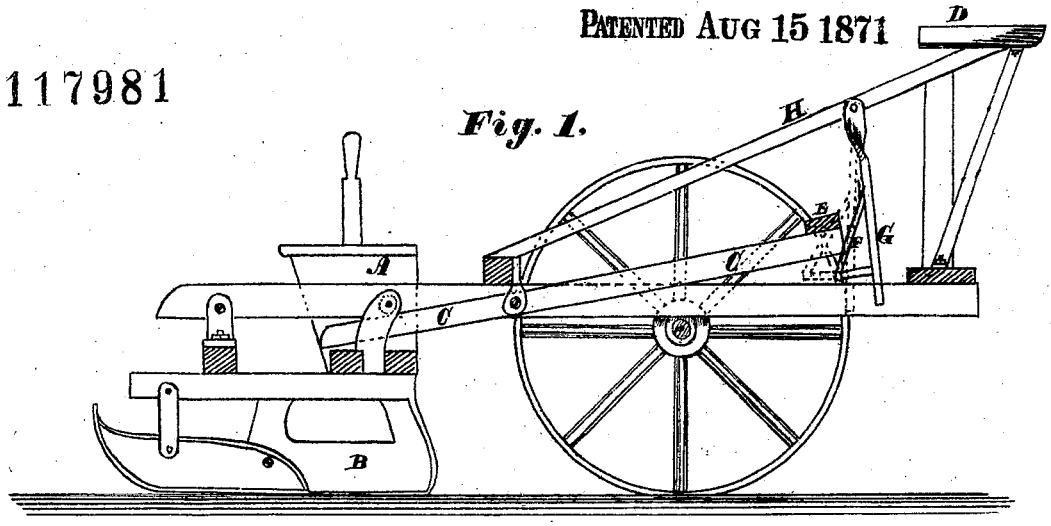
Figure 3:
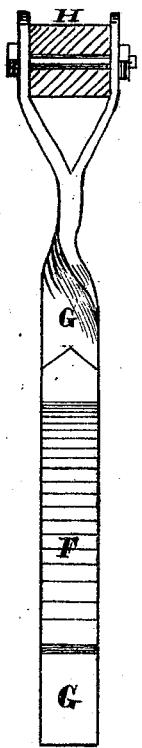
Figure 2:
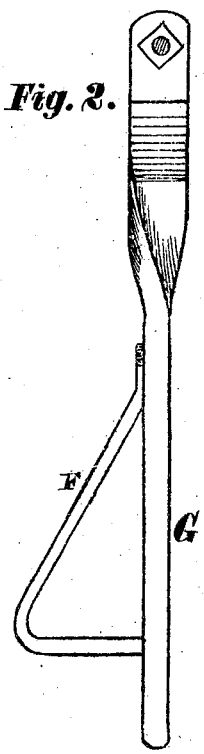

Figure 1 is a side sectional elevation of a corn-planter embodying my invention. Fig. 2 is an enlarged side view of catch. Fig. 3 is a front view of catch.

A is the seed-box of a corn-planter, which seed-box and runners B are raised from the ground by the levers C C. The driver, who is seated upon the seat D, presses his feet upon the levers C C. These levers, of which only one is shown in the drawing, are connected by cross-bar E. As the levers are pressed (down the cross-bar E, sliding on the incline F of the catch G,) the catch, being forked and bolted to the bar H, is forced back. When the cross-bar E reaches the bottom of the incline the catch swings forward by its own weight, and, catching on the cross-bar E, holds the levers down.

To disengage the catch, press the levers down with the feet until the cross-bar is clear of the catch, kick the catch back with the foot, releasing the cross-bar, and dropping the runners to the ground.

By this device the runners are held from the ground in turning the machine at the end of the field, so that when the driver has to dismount from his seat to place the rope (when a check power is used) he can turn the machine while on the ground. This device is also useful on the road, as it is tiresome to the driver to hold the levers down with his feet when it is necessary to move the planter any distance.

I claim as my invention—

The catch G, constructed and operating substantially as described, and for the purpose hereinbefore set forth.

WILLIAM B. CHAMBERS.

Witnesses:
WILBUR F. EDMUNDSON,
JNO. G. CLOYD.